(12) United States Patent
Potter

(10) Patent No.: US 12,280,332 B2
(45) Date of Patent: Apr. 22, 2025

(54) SYSTEM AND METHOD FOR LOWERING NITROGEN OXIDES CONTENT FROM TAIL GAS

(71) Applicant: Dean Carl Potter, Wichita, KS (US)

(72) Inventor: Dean Carl Potter, Wichita, KS (US)

( * ) Notice: Subject to any disclaimer, the term of this patent is extended or adjusted under 35 U.S.C. 154(b) by 180 days.

(21) Appl. No.: 18/139,372

(22) Filed: Apr. 26, 2023

(65) Prior Publication Data
US 2024/0359135 A1   Oct. 31, 2024

(51) Int. Cl.
*B01D 53/86*   (2006.01)
*B01D 53/90*   (2006.01)
*B01F 25/312*  (2022.01)

(52) U.S. Cl.
CPC ......... *B01D 53/8631* (2013.01); *B01D 53/90* (2013.01); *B01F 25/3125* (2022.01); *B01D 2251/2062* (2013.01); *B01D 2257/402* (2013.01); *B01D 2257/404* (2013.01)

(58) Field of Classification Search
CPC ............ F01N 2240/20; F01N 2610/02; F01N 2470/30; F01N 2610/1453; F01N 3/2892; B01F 23/2132; B01F 25/312; B01F 25/4335; B01F 25/435; B01F 25/3131; B01F 25/31241; B01F 25/3121; B01F 25/103; B01F 25/3141
See application file for complete search history.

(56) References Cited

U.S. PATENT DOCUMENTS

| | | | |
|---|---|---|---|
| 8,683,783 B2* | 4/2014 | Suzuki | B01F 25/312 60/286 |
| 10,632,430 B1* | 4/2020 | Liu | B01F 25/3121 |
| 2008/0116054 A1* | 5/2008 | Leach | B01D 53/72 204/157.3 |
| 2021/0372313 A1* | 12/2021 | Liu | B01F 25/31425 |

* cited by examiner

*Primary Examiner* — Anthony Ayala Delgado
(74) *Attorney, Agent, or Firm* — Alloy Patent Law; Walker Griffin Weitzel

(57) ABSTRACT

The present invention relates to a tail gas treatment system as well as method for lowering nitrogen oxides content from the tail gas. The tail gas treatment system includes a tail gas main pipe carrying a tail gas and a tail gas bypass pipe. The treatment system also includes a centrifugal venturi sparger assembly arranged at an end of the tail gas bypass pipe. The centrifugal venturi sparger assembly extends at least substantially in the tail gas main pipe. The centrifugal venturi sparger assembly includes a vacuum venturi generator and a hollow sparger tube. The treatment system further includes a catalytic reactor to reduce nitrogen oxides content of the tail gas by catalytic reduction.

13 Claims, 10 Drawing Sheets

SYSTEM AND METHOD FOR LOWERING NITROGEN OXIDES CONTENT FROM TAIL GAS

FIELD OF THE INVENTION

The present invention relates to nitric acid production, and more particularly, the present invention relates to lowering nitrogen oxide content from tail gas in a nitric acid production plant.

BACKGROUND

Nitric acid (HNO3) is a chemical used in the process industry with a major share of its consumption in making fertilizers. Nitric acid (HNO3) production plants typically oxidize Ammonia (NH3) over a noble metal catalyst with air to convert it into Nitrogen Oxides (NOx), which is a mixture of Nitric Oxide (NO) and Nitrogen Dioxide (NO2). In addition, a relatively small quantity of Nitrous oxide (N2O) is created. The nitrogen dioxide (NO2)-containing gas mixture (NOx) is then passed through an absorption column, in a counter-current flow relationship to a current of an aqueous medium (water), and the resulting nitric acid is produced from the process. The tail gas (also referred to as "exhaust gas" or "off-gas") from the absorption process, in Nitric Acid (HNO3) production plants operated at pressures higher than ambient pressure, is heated and energy from the pressurized gas stream is recovered in the turbo expander prior to exhausting to the atmosphere. The goal of Nitric Acid production plants is to lower the Nitrogen Oxides (NOx) contents (emissions) of the tail gas.

Nitrogen Oxides (NOx) gas has harmful effects on the environment. Elevated levels of nitrogen dioxide gas can cause damage to the human respiratory tract and increase a person's vulnerability to, and the severity of, respiratory infections and asthma. Long-term exposure to high levels of nitrogen dioxide can cause chronic lung diseases. High levels of nitrogen dioxide are also harmful to vegetation-damaging foliage, decreasing growth, or reducing crop yields.

Generally, modern Nitric Acid (HNO3) production plants operate at higher absorption pressure and, thus, tend to have lower Nitrogen Oxides (NOx) contents. With increasing environmental concerns and stricter regulations all around the world, newly constructed Nitric Acid (HNO3) production plants tend to be rated by various regulatory agencies, and the Nitrogen Oxides (NOx) contents are controlled to be within permissible limits.

A number of solutions exist in the prior art for lowering Nitrogen Oxides (NOx) contents from tail gas. The prior art solutions include Selective Catalytic Reduction (SCR), Selective Non-Catalytic Reduction (SNCR), Non-Selective Non-Catalytic Reduction, scrubbing with an alkaline solution to form nitrate/nitrite, and extending aqueous scrubbing at a low temperature around 4° Celsius. in the absorption column. The selection and practice of Nitrogen Oxides (NOx) contents control method will vary from case to case depending on the operating parameters of the nitric acid production process, regulatory mandates, and economic attractiveness.

One such commonly used solution for lowering Nitrogen Oxides (NOx) contents from tail gas involves the use of a catalytic reactor and a fuel (reducing agent). The catalytic reactor and a fuel such as but not limited to: hydrogen, methane, or ammonia is used to convert the Nitrogen Oxides (NOx) or Nitrous Oxide (N2O) of the tail gas back into nitrogen (N2) and oxygen (O2). The fuel that is injected in the tail gas needs to mix well with the tail gas before reaching the catalytic reactor such that the tail gas and fuel mixture is homogeneous in the reactor. The fuel and the nitrogen oxides (NOx) if perfectly mixed could result in zero nitrogen oxides (NOx) contents from the nitric acid plant. Any reduction in mixing requires excess fuel to be injected to ensure that the nitrogen oxides (NOx) are fully consumed. That excess fuel (200% excess fuel) is discharged into the atmosphere, which is not a cost-effective solution to achieve low Nitrogen Oxides (NOx) contents.

Prior art solutions that are less common have used small jet-like holes and high fuel pressures to squirt the fuel into the tail gas stream, but these only work in high flow conditions and resort to excess fuel methods at lower flow rates. Another prior art solution uses atomizing misting nozzles to inject the fuel into the tail gas stream, similar to how diesel exhaust fluid (DEF) fluid diesel catalytic converters work for large trucks. Another prior art solution also uses static mixers downstream of the injection point to further mix the fuel, but those mixers cause energy losses that reduce the capacity of the production plant, which again drives them back to just running excess fuel.

Another prior art solution as suggested by U.S. Pat. No. 9,302,222B2 that discloses a method and system for reducing the nitrogen oxides off-gas concentration in a nitric acid plant operated under pressure and equipped with a residual gas purification. The first reactor is configured to remove nitrogen oxides from the off-gas during steady-state operation of the plant, and a second reactor is configured to remove nitrogen oxides from the off-gas during a start-up and/or shut down of the plant. The method includes, during start-up and/or shut-down of the nitric acid plant, passing pressurized nitrogen-oxide-containing off-gas from the nitric acid plant and a gaseous reducing agent for the nitrogen oxides into the second reactor charged with a catalyst, to reduce the NOx content in the off-gas by catalytic reduction. Using the process and system, a colorless start-up and shut-down of nitric acid plants is possible and the nitrogen oxides content in the off-gas during start-up and/or shutdown can be substantially lowered.

The prior art solutions related to lowering Nitrogen Oxides (NOx) contents from the tail gas have design flaws, are inefficient, uneconomical, impractical, consume more fuel, and are complex in nature. There is a need for an effective and efficient solution that solves the aforementioned problem of existing prior art solutions by providing a new and improved system as well as a method for lowering Nitrogen Oxides (NOx) contents.

SUMMARY

While the way that the present disclosure addresses the disadvantages of the prior art will be discussed in greater detail below, in general, the present disclosure provides a system as well as a method for lowering nitrogen oxides content in a nitric acid production plant.

The present disclosure overcomes the drawbacks of the existing devices by providing a system for lowering nitrogen oxides content in a nitric acid production plant comprising: a tail gas main pipe carrying a tail gas; at least one tail gas bypass pipe comprising a first end in fluid communication with the tail gas main pipe, and an opposite second end, wherein the tail gas bypass pipe carries a portion of tail gas; a centrifugal venturi sparger assembly arranged at the second end of the tail gas bypass pipe and extending at least substantially in the tail gas main pipe; wherein the centrifugal venturi sparger assembly comprises: a vacuum venturi generator comprising at least one fuel inlet, a gas inlet and at least one jet nozzle in fluid communication with the fuel inlet and the gas inlet for ejecting a fuel gas mixture inside a hollow sparger tube; wherein the hollow sparger tube is configured for producing a centrifugal swirl flow for the fuel gas mixture; wherein the hollow sparger tube comprises a plurality of angled outlet holes configured to eject the fuel gas mixture in the tail gas main pipe; a central swirl tube centrally positioned inside the hollow sparger tube; and a catalytic reactor arranged at an end of the tail gas main pipe, wherein the catalytic reactor is configured to reduce nitrogen oxides content of tail gas by catalytic reduction.

In an embodiment, the fuel comprises at least one of: Ammonia (NH3) gas, Hydrogen, or Methane.

In an embodiment, the plurality of angled outlet holes are oblong-shaped in nature.

In an embodiment, the longitudinal axis of each of the plurality of angled outlet holes subtends an angle in the range of 5 degrees to 85 degrees relative to the longitudinal axis of the hollow sparger tube.

In an embodiment, the hollow sparger tube comprises a first end configured to receive the fuel gas mixture ejected by the jet nozzle(s).

In an embodiment, an end cap is positioned at a second end of the hollow sparger tube.

In an embodiment, a plurality of helical stakes are formed on an exterior surface of the hollow sparger tube.

In an embodiment, an aerodynamic tip is formed at a first end of the central swirl tube.

In an embodiment, the central swirl tube comprises a plurality of swirl baffles configured to swirl the fuel gas mixture of the hollow sparger tube.

In an embodiment, the catalytic reactor comprises at least one catalyst disposed therein and configured to reduce a content of nitrogen oxides in the tail gas by a reaction with the catalyst and/or fuel for decomposition of nitrogen oxides to nitrogen and oxygen.

In an embodiment, the catalytic reactor comprises a blocking plate that is configured to provide an impinging surface for the fuel gas mixture entering the catalytic reactor, and a plurality of V-shaped notched channels that are configured to redirect the fuel gas mixture impinging on the blocking plate towards at least one catalyst of the catalytic reactor.

In an embodiment, a plurality of flow control valves are arranged to control the flow rate of at least one of: tail gas, dilution gas, and fuel.

Embodiments of the present invention further disclose a centrifugal venturi sparger assembly comprising: a vacuum venturi generator configured for drawing a portion of tail gas, wherein the vacuum venturi generator comprises at least one fuel inlet, a gas inlet, and at least one jet nozzle in fluid communication with the fuel inlet and the gas inlet for ejecting a fuel gas mixture inside the hollow sparger tube. The hollow sparger tube is configured for producing a centrifugal swirl flow for the fuel gas mixture, wherein the hollow sparger tube further comprises a first end configured to receive the fuel gas mixture ejected by the jet nozzle(s), and an opposite second end, a plurality of angled outlet holes formed in the hollow sparger tube wherein the plurality of angled outlet holes are configured to eject the fuel gas mixture in the tail gas main pipe; a central swirl tube comprising a first end and an opposite second end; wherein the central swirl tube is centrally positioned inside the hollow sparger tube; and an end cap positioned at the second end of the central swirl tube and the second end of the hollow sparger tube.

In an embodiment, the fuel comprises at least one of: ammonia, hydrogen, or methane.

In an embodiment, the plurality of angled outlet holes are oblong-shaped in nature.

In an embodiment, the longitudinal axis of each of the plurality of angled outlet holes subtends an angle in the range of 5 degrees to 85 degrees relative to the longitudinal axis of the hollow sparger tube.

In an embodiment, a plurality of helical stakes are formed on an exterior surface of the hollow sparger tube.

In an embodiment, an aerodynamic tip is formed at a first end of the central swirl tube.

In an embodiment, the central swirl tube comprises a plurality of swirl baffles configured to swirl the fuel gas mixture of the hollow sparger tube.

Embodiments of the present invention further disclose a method for lowering nitrogen oxides content from a tail gas comprising the steps of:
a) providing a tail gas main pipe and at least one tail gas bypass pipe, wherein the tail gas bypass pipe comprises a first end in fluid communication with the tail gas main pipe and an opposite second end, wherein a centrifugal venturi sparger assembly is arranged at the second end of the tail gas bypass pipe and extends at least substantially in the tail gas main pipe;
b) feeding tail gas in a tail gas main pipe;
c) introducing a fuel in a centrifugal venturi sparger assembly arranged at an end of the tail gas bypass pipe;
d) drawing a portion of tail gas in the centrifugal venturi sparger assembly, thereby producing a fuel gas mixture;
e) subjecting the fuel gas mixture to a centrifugal swirl process in the centrifugal venturi sparger assembly for producing a centrifugal swirl flow fuel gas mixture;
f) mixing the centrifugal swirl flow fuel gas mixture produced by the centrifugal venturi sparger assembly with the tail gas in the tail gas main pipe;
g) feeding the mixture containing the centrifugal swirl flow fuel gas mixture and tail gas in a catalytic reactor; and
h) reducing nitrogen oxides content of tail gas in the catalytic reactor; thereby lowering nitrogen oxide content from a tail gas.

BRIEF DESCRIPTION OF THE DRAWINGS

A more complete understanding of the present disclosure may be derived by referring to the detailed description and claims when considered in connection with the figures, wherein like reference numerals refer to similar elements throughout the figures.

DETAILED DESCRIPTION

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms, and the like and still fall within the scope of the present invention. Thus, the detailed description herein is presented for purposes of illustration only and not for limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The system as well as the method for lowering nitrogen oxides content in a nitric acid production plant will now be described with reference to the accompanying drawings, particularly FIGS. 1-10.

Figure 1:
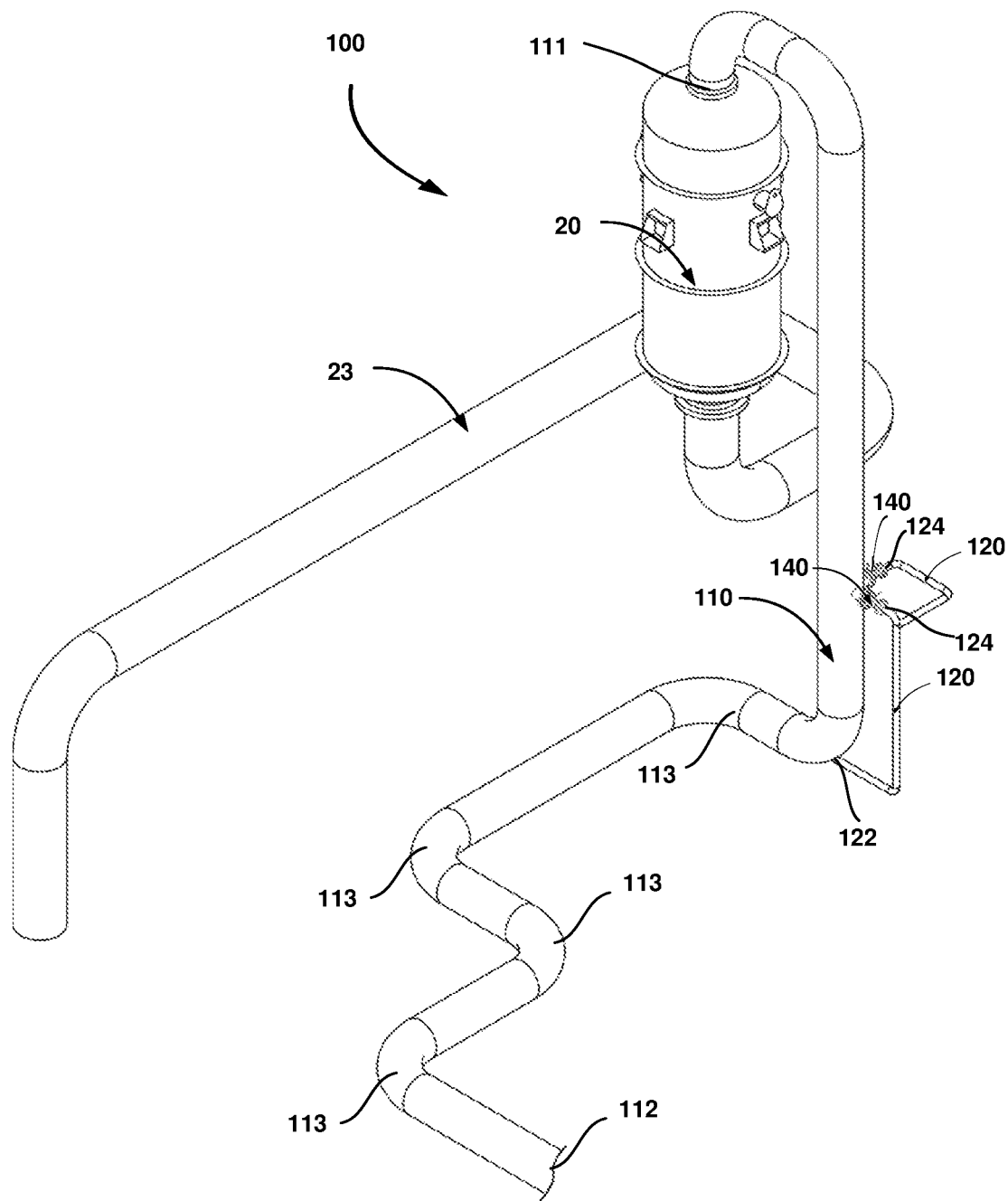
FIG. 1 illustrates a front perspective view of a tail gas treatment system for lowering nitrogen oxides content in a nitric acid production plant, according to an embodiment of the present invention.

Reference is initially made to FIG. 1 which illustrates a front perspective view of a tail gas treatment system 100 for lowering nitrogen oxides content in a conventional nitric acid production plant 10 (not shown in figures), according to an embodiment of the present invention. As shown in FIG. 1, the tail gas treatment system 100 comprises a tail gas main pipe 110, a pair of tail gas bypass pipes 120, and a catalytic reactor 20. The tail gas main pipe 110 carries a tail gas at a sufficiently high temperature (in the range of 1000 degrees Fahrenheit) that is produced as a by-product of the nitric acid generation process. The tail gas main pipe 110 comprises an inlet 112 to receive the tail gas. The inlet 112 could be connected to any gas propulsion device of conventional nitric acid production plant 10 (not shown in figures) such as but not limited to: compressor, pump, chimney, exhaust gas channel, and so on. Further, a plurality of expansion loops 113 (optional) are positioned in the tail gas main pipe 110 to prevent thermal expansion and contraction from causing excessive stresses in the tail gas main pipe 110. The tail gas comprises nitrogen oxides content (emissions) in a relatively small percentage (proportion) which is potentially harmful to the environment if released in the environment. Each tail gas bypass pipe 120 is configured to carry (draw) a portion of tail gas (also referred to as dilution gas). Each tail gas bypass pipe 120 comprises a first end 122 in fluid communication with the tail gas main pipe 110, and an opposite second end 124. The tail gas main pipe 110 further comprises a pair of connector elements 125, wherein each connector element 125 includes a flange portion 125A that is configured to connect the pair of centrifugal venturi sparger assemblies 140 with the tail gas main pipe 110, the entirety of which will be described in greater detail in below description.

As shown in FIG. 1, the pair of tail gas bypass pipes 120 comprises a common first end 122. The second end 124 of each tail gas bypass pipe 120 is distinct from one another and comprises a flanged portion. A catalytic reactor 20 is arranged at the end 111 of the tail gas main pipe 110 and the catalytic reactor 20 is configured to reduce nitrogen oxides content of tail gas by catalytic reduction. The catalytic reactor 20 is configured to reduce the content of nitrogen oxides in the tail gas. In the catalytic reactor 20, the NOx content in the tail gas is reduced by catalytic reduction, or wherein the NOx content in the tail gas is reduced by catalytic reduction and the N2O content in the tail gas is reduced by at least one of catalytic reduction or catalytic decomposition in the catalytic reactor 20. Further, as seen in FIG. 1, the catalytic reactor 20 is connected at downstream to an outlet pipe 23.

In an embodiment (not shown in figures), the outlet pipe 23 is further connected at downstream to an absorption/adsorption bed (not shown in figures) that separates nitrogen from oxygen for various purposes known in the art.

In another embodiment (not shown in figures), the outlet pipe 23 is further connected downstream to a hot gas expander (not shown in figures) that converts the thermal energy of tail gas into useful power and then, provides power for the operation of the tail gas treatment system 100.

The content of nitrogen oxides in the tail gas is reduced in a catalytic reactor 20 by means of fuel (also referred to as "reducing agent") during the decompression operation. It is thus possible to dispense with the dilution of the decompressed tail gas with air. In a preferred embodiment, the catalytic reactor 20 works on the SCR principle ("SCR"=selective catalytic reduction).

The catalytic reactor 20 is charged with catalysts for degradation of NOx ("deNOx catalysts"). These catalysts are known to those skilled in the art. In general, these are transition metal catalysts that promote the chemical reaction of NOx with reducing agents. Preference is given to conventional deNOx catalysts, especially to those comprising transition metals and/or transition metal oxides, for example iron oxides, nickel oxides, copper oxides, cobalt oxides, manganese oxides, rhodium oxides, rhenium oxides or vanadium oxides, or metallic platinum, gold or palladium, or else mixtures of two or more of these compounds. Particular preference is given to catalysts based on V2O5-TiO2. The catalysts may be present in the catalytic reactor 20 in all arrangements known to those skilled in the art. These may include beds of finely divided catalyst material of any geometry, such that one or more catalyst beds are formed. The catalysts may also be present in honeycomb form in the catalytic reactor 20.

Figure 4:
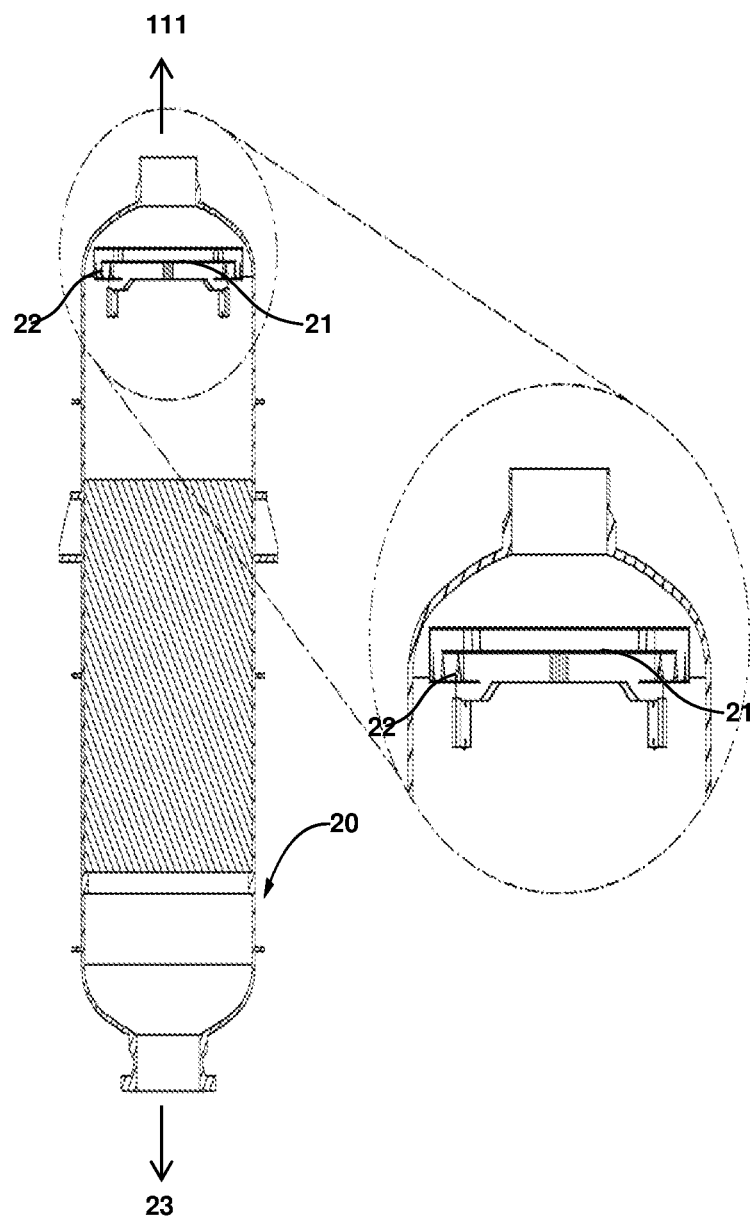
FIG. 4 illustrates a sectional front view of a catalytic reactor of FIG. 1.

FIG. 4 illustrates a sectional front view of a catalytic reactor 20 of FIG. 1. Further, FIG. 4 illustrates an enlarged view of a section of catalytic reactor 20 shown in a dotted circle. Referring to FIG. 4, the catalytic reactor 20 comprises a blocking plate 21 that is configured to provide an impinging (strike) surface for the fuel gas mixture entering the catalytic reactor 20. The blocking plate 21 serves as a means of homogeneously mixing the fuel gas mixture. The catalytic reactor 20 includes a plurality of V-shaped notched channels 22 that are configured to redirect the fuel gas mixture impinging on the blocking plate 21 towards the catalysts of the catalytic reactor 20.

Figure 2:
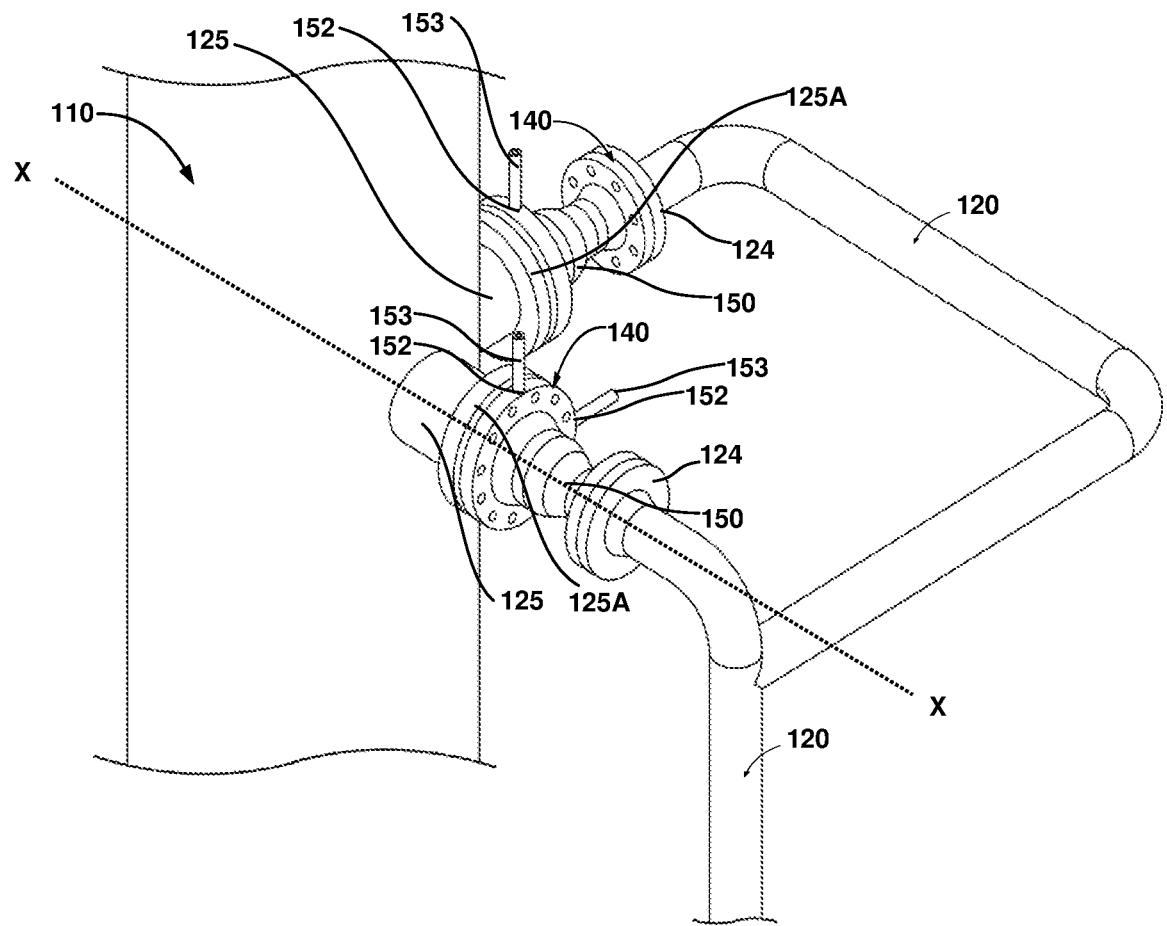
FIG. 2 illustrates a front perspective view of a tail gas bypass pipe of the tail gas treatment system of FIG. 1.
Figure 3:
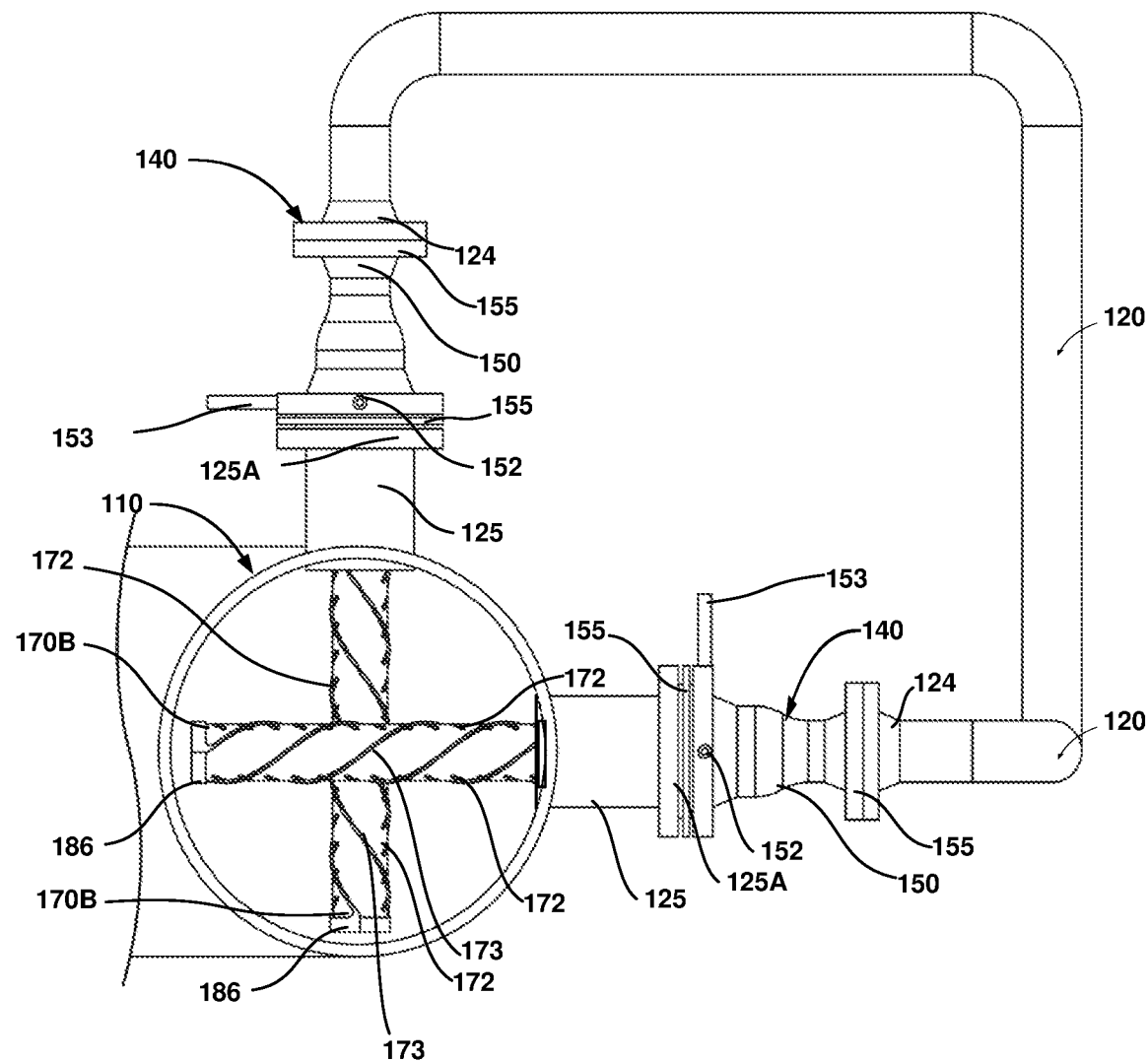
FIG. 3 illustrates a sectional top view of FIG. 2 wherein a pair of centrifugal venturi sparger assemblies of the tail gas bypass pipe extends in a tail gas main pipe of the tail gas treatment unit.

FIG. 3 illustrates a sectional top view of FIG. 2 wherein a pair of centrifugal venturi sparger assemblies 140 of the tail gas bypass pipes 120 extends in a tail gas main pipe 110 of the tail gas treatment unit 100. Referring to FIGS. 1-3, each centrifugal venturi sparger assembly 140 is arranged at the second end 124 of each tail gas bypass pipe 120, and each centrifugal venturi sparger assembly 140 extends at least substantially in the tail gas main pipe 110, the entirety of which will be described in greater detail in below description. Both of the centrifugal venturi sparger assemblies 140 are identical in construction and functionality and thus, only one of the centrifugal venturi sparger assemblies 140 will be described in detail in the below description. Each centrifugal venturi sparger assembly 140 is connected to a connector element 125 of the tail gas main pipe 110 at one end, and each centrifugal venturi sparger assembly 140 is connected to the second end 124 of the tail gas bypass pipe 120 at the opposite end. As seen in FIGS. 1-3, the pair of centrifugal venturi sparger assemblies 140 are disposed substantially perpendicular to one another. Further, as seen in FIG. 3, the plurality of angled outlet holes 172 are formed in the cylindrical wall of the hollow sparger tube 170 in two straight line array patterns wherein each straight line array pattern includes a plurality of angled outlet holes 172 arranged parallel to each other.

Referring to FIGS. 5-10, a centrifugal venturi sparger assembly 140 comprises a vacuum venturi generator 150 configured for drawing a portion of tail gas (also referred to as "dilution gas"). The vacuum venturi generator 150 comprises two fuel inlets 152, a gas inlet 153, and a plurality of jet nozzles 160. Further, in FIG. 2, two fuel inlets 152 are shown which are respectively connected to a distinct fuel supply pipe 153. The plurality of jet nozzles 160 are in fluid communication with the two fuel inlets 152 and the gas inlet 153 for ejecting a fuel gas mixture inside the hollow sparger tube 170.

The vacuum venturi generator 150 operates on the "venturi effect" principle such that when a fuel coming from the fuel inlet 152 flows through a constricted section (or choke) of the vacuum venturi generator 150, pressure reduction takes place, thereby creating a vacuum which draws a portion of tail gas (referred as "dilution gas") in the vacuum venturi generator 150 arranged in the tail gas bypass pipe 120. The vacuum venturi generator 150 converts stored pressure energy of the fuel into momentum energy and drives the flow of a portion of tail gas (referred to as "dilution gas") while also creating a primary mixing of the tail gas and fuel. The vacuum venturi generator 150 could have an internal design that is suited for the primary mixing of the tail gas and fuel.

Further, the vacuum venturi generator 150 comprises a flange coupling 155 having flange screw holes to connect the vacuum venturi generator 150 with the flange portion 125A of the connector element 125 of tail gas main pipe 110. Another flange coupling 155 of the vacuum venturi generator 150 is configured to connect the vacuum venturi generator 150 with the flanged portion of the second end 124 of the tail gas bypass pipe 120.

In an embodiment as seen in FIGS. 5-10, a first group of jet nozzles 160 selected from the plurality of jet nozzles 160 are in fluid communication with a first fuel inlet 152 and the gas inlet 153 for ejecting a fuel gas mixture inside the hollow sparger tube 170. A second group of jet nozzles 160 (remaining jet nozzles 160) selected from the plurality of jet nozzles 160 are in fluid communication with a second fuel inlet 152 and the gas inlet 153 for ejecting a fuel gas mixture inside the hollow sparger tube 170. The configuration of two fuel inlets 152 fluidly connected to two different groups of jet nozzles 160 has the following advantages: The tail gas treatment system 100 could be operated at lower load capacities (for instance, 50 percent of total load) due to various factors such as but not limited to:—(a) when the nitric acid production requirement is less (for instance 50 percent of average production) (b) limited availability of fuel (c) tail gas already has low nitrogen oxides content. Thus, in low-load situations, only a first group (for instance: 50 percent) of the total of the plurality of jet nozzles 160 are supplied with the fuel through a first fuel inlet 152, while the second group of the total of the plurality of jet nozzles 160 with any fuel from the second fuel inlet 152, thereby saving more fuel by only utilizing selected group of the plurality of jet nozzles 160.

In another embodiment (not shown in figures), the vacuum venturi generator 150 comprises a central nozzle 160 instead of a plurality of jet nozzles 160. The central nozzle 160 is only used when there is limited space as it doesn't perform as well compared with the plurality of jet nozzles 160.

In another embodiment (not shown in figures), the vacuum venturi generator 150 could be substituted with a suction fan (not shown in figures). The suction fan (not shown in figures) is able to withstand high temperatures (in the range of 1000 degrees Fahrenheit) and high pressure (in the range of 100 pounds per square inch).

In various embodiments, the fuel comprises at least one of: ammonia gas, hydrogen, or methane. In a preferred embodiment, the fuel is ammonia gas at high pressure. The fuel is configured to act as a gaseous reducing agent during the catalytic reduction process in the catalytic reactor 20.

The hollow sparger tube 170 is configured for producing a centrifugal swirl flow for the fuel gas mixture; wherein the hollow sparger tube 170 further comprises a first end 170A configured to receive the fuel gas mixture ejected by the plurality of jet nozzles 160, and an opposite second end 170B.

The hollow sparger tube 170 has a general cylindrical wall profile. A plurality of angled outlet holes 172 are at least substantially formed in a portion of a cylindrical wall of the hollow sparger tube 170 wherein the plurality of angled outlet holes 172 are configured to eject the fuel gas mixture in the tail gas main pipe 110. The hollow sparger tube 170 at least extends through the tail gas main pipe 110. Further, the hollow sparger tube 170 comprises a flat extension portion 174 that is configured to be positioned inside the connector element 125 of the tail gas main pipe 110. Referring to FIGS. 1-7, the portion of the hollow sparger tube 170 that comprises a plurality of angled outlet holes 172 are freely positioned inside the tail gas main pipe 110, wherein the flat extension portion 174 of the hollow sparger tube 170 is positioned inside the connector element 125 of the tail gas main pipe 110.

Figure 5:
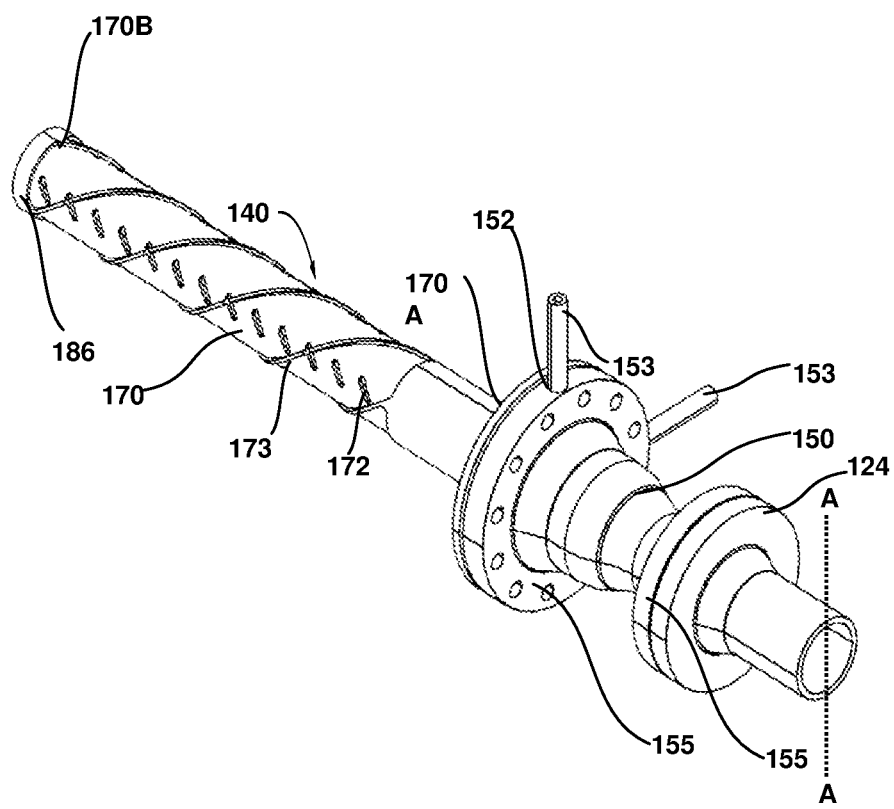
FIG. 5 illustrates a front perspective view of a centrifugal venturi sparger assembly arranged in the tail gas bypass pipe of FIG. 1.
Figure 6:
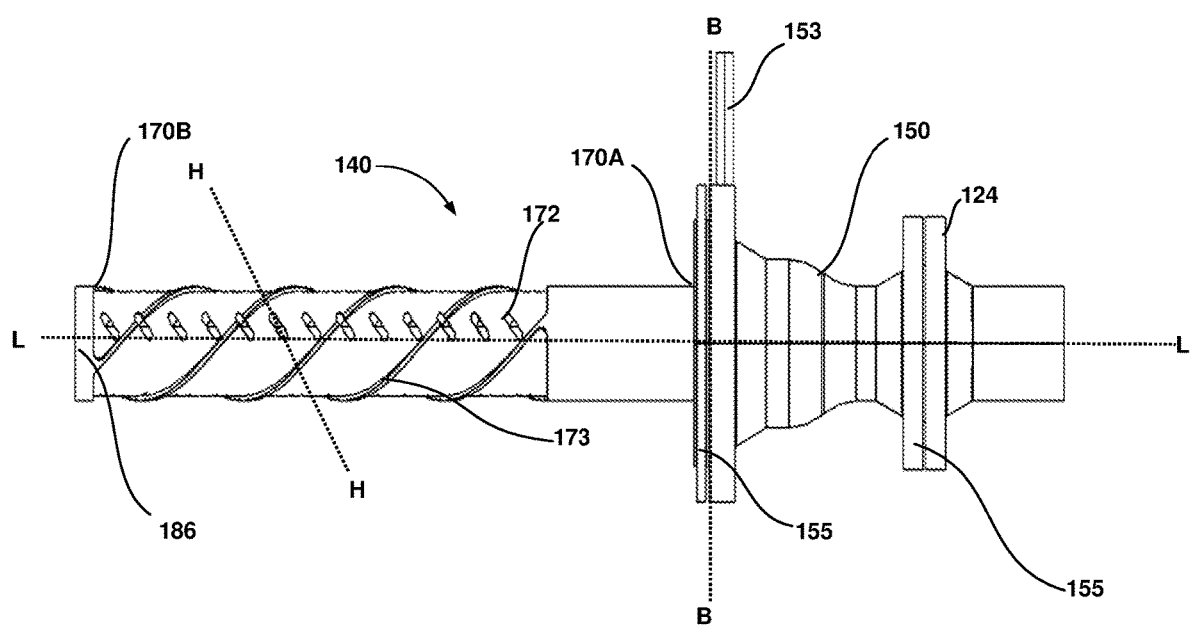
FIG. 6 illustrates a front view of a centrifugal venturi sparger assembly of FIG. 5.

In an embodiment as seen in FIGS. 5-6, the plurality of angled outlet holes 172 are oblong-shaped in nature. In other embodiments (not shown in figures), the plurality of angled outlet holes 172 could have other shapes such as but not limited to circular shape, rectangle shape, square shape, triangle shape, and so on. As seen in FIG. 6, the longitudinal axis H (represented in dotted lines) of each of the plurality of angled outlet holes 172 subtends an angle in the range of 45 degrees relative to the longitudinal axis L (represented in dotted lines) of the hollow sparger tube 170. However, it should be understood that the longitudinal axis H (represented in dotted lines) of each of the plurality of angled outlet holes 172 could subtend an angle in the range of 5 degrees to 85 degrees relative to the longitudinal axis L (represented in dotted lines) of the hollow sparger tube 170. Further, as seen in FIG. 3, the plurality of angled outlet holes 172 are formed in the cylindrical wall of the hollow sparger tube 170 in two straight line array patterns wherein each straight line array pattern includes a plurality of angled outlet holes 172 arranged parallel to each other. The dimensions such as the diameter of the plurality of angled outlet holes 172 are selected to provide the desired swirling effect for the fuel gas mixture.

A plurality of helical strakes 173 are formed on an exterior surface 171 of the hollow sparger tube 170. The plurality of helical strakes 173 serves to reduce the vortex-induced vibrations induced due to the swirl flow of the fuel gas mixture inside the hollow sparger tube 170. The plurality of helical strakes 173 thus acts as stabilizers that handle various forces and deflections experienced by the hollow sparger tube 170. The plurality of helical strakes 173 comprises a spiral like protrusion that is dimensioned to reduce the vortex-induced vibrations induced due to swirl flow of fuel gas mixture inside the hollow sparger tube 170.

In an embodiment as seen in FIGS. 5-10, the plurality of angled outlet holes 172 are equal in shape and size. In other embodiments (not shown in figures), the plurality of angled outlet holes 172 can have a distinct shape and size that is different from one another.

Figure 7:
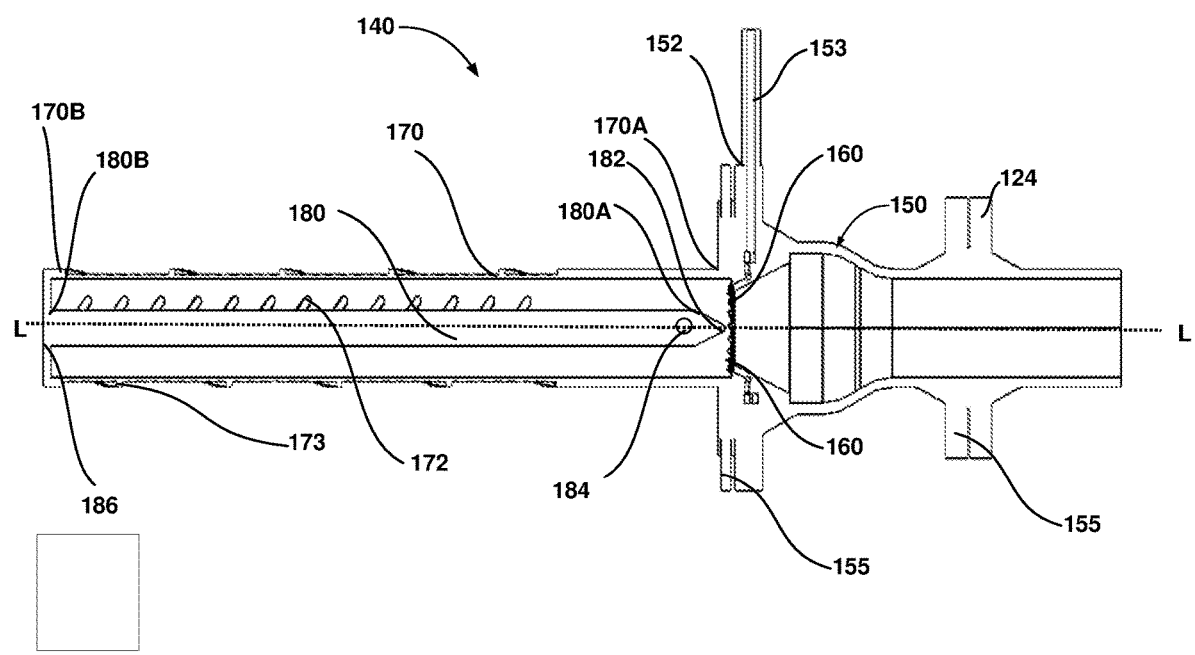
FIG. 7 illustrates a front sectional view of a centrifugal venturi sparger assembly of FIG. 5.
Figure 8:
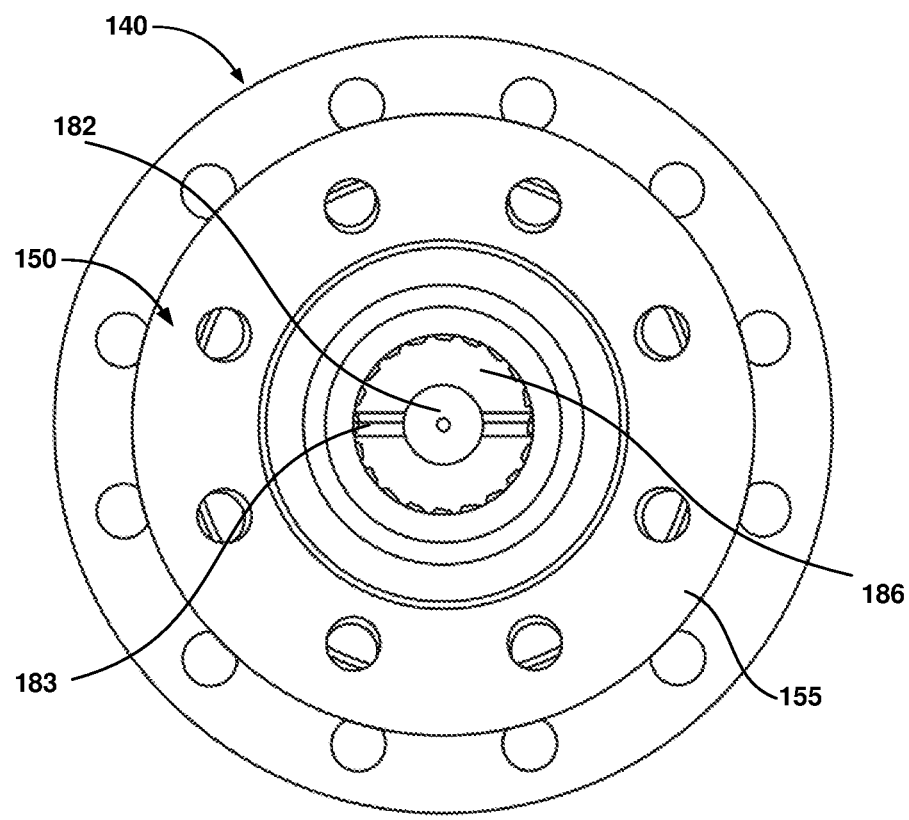
FIG. 8 illustrates a right-hand side view of a centrifugal venturi sparger assembly of FIG. 5.
Figure 9:
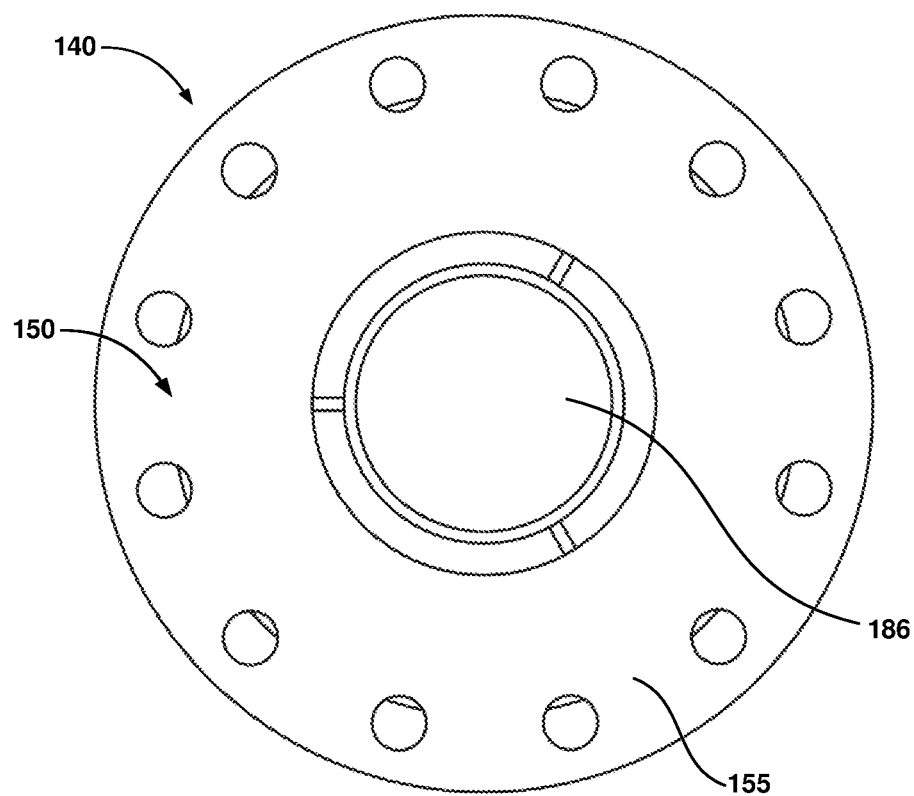
FIG. 9 illustrates a left-hand side view of a centrifugal venturi sparger assembly of FIG. 5.

FIG. 7 illustrates a front sectional view of a centrifugal venturi sparger assembly of FIG. 5 taken along lines A-A. Referring to FIG. 7, a central swirl tube 180 comprises a first end 180A and an opposite second end 180B. The central swirl tube 180 is centrally positioned inside the hollow sparger tube 170. The central swirl tube 180 serves the function of providing a swirl surface for the fuel gas mixture in the hollow sparger tube 170, thereby preventing the fuel gas mixture from becoming turbulent in nature. In other words, the central swirl tube 180 creates a central rotational axis for the fuel gas mixture and prevents a dead spot in the middle of the hollow sparger tube 170. An aerodynamic tip 182 is formed at the first end 180A of the central swirl tube 180 to prevent flow from becoming turbulent. A fixing rod 183 (FIG. 8) passes through a fixing hole 184 of the central swirl tube 180, wherein the fixing rod 183 (FIG. 8) is fixedly connected to the hollow sparger tube 170 to enable central placement of the central swirl tube 180 within the hollow sparger tube 170.

In another embodiment (not shown in figures), the central swirl tube 180 comprises a plurality of swirl baffles 185 (not shown in figures) configured to swirl the fuel gas mixture of the hollow sparger tube 170. The swirl baffles 185 (not shown in figures) are formed on the exterior surface of the central swirl tube 180 to assist in swirling (spinning) the fuel gas mixture of the hollow sparger tube 170. In an embodiment (not shown in figures), the swirl baffles 185 (not shown in figures) are fixed guiding plates arranged on the exterior surface of the central swirl tube 180 to assist in swirling (spinning) the fuel gas mixture of the hollow sparger tube 170. The configuration of the swirl baffles 185 (not shown in figures) is particularly advantageous when a central nozzle 160 is used, according to an embodiment of the present invention.

An end cap 186 is positioned at the second end 180B of the central swirl tube 180 and the second end 170B of the hollow sparger tube 170. The end cap 186 serves to close (seal) the second end 180B of the central swirl tube 180 and the second end 170B of the hollow sparger tube 170, thereby allowing the fuel gas mixture to only eject from the plurality of angled outlet holes 172 into the tail gas main pipe 110.

Figure 10:
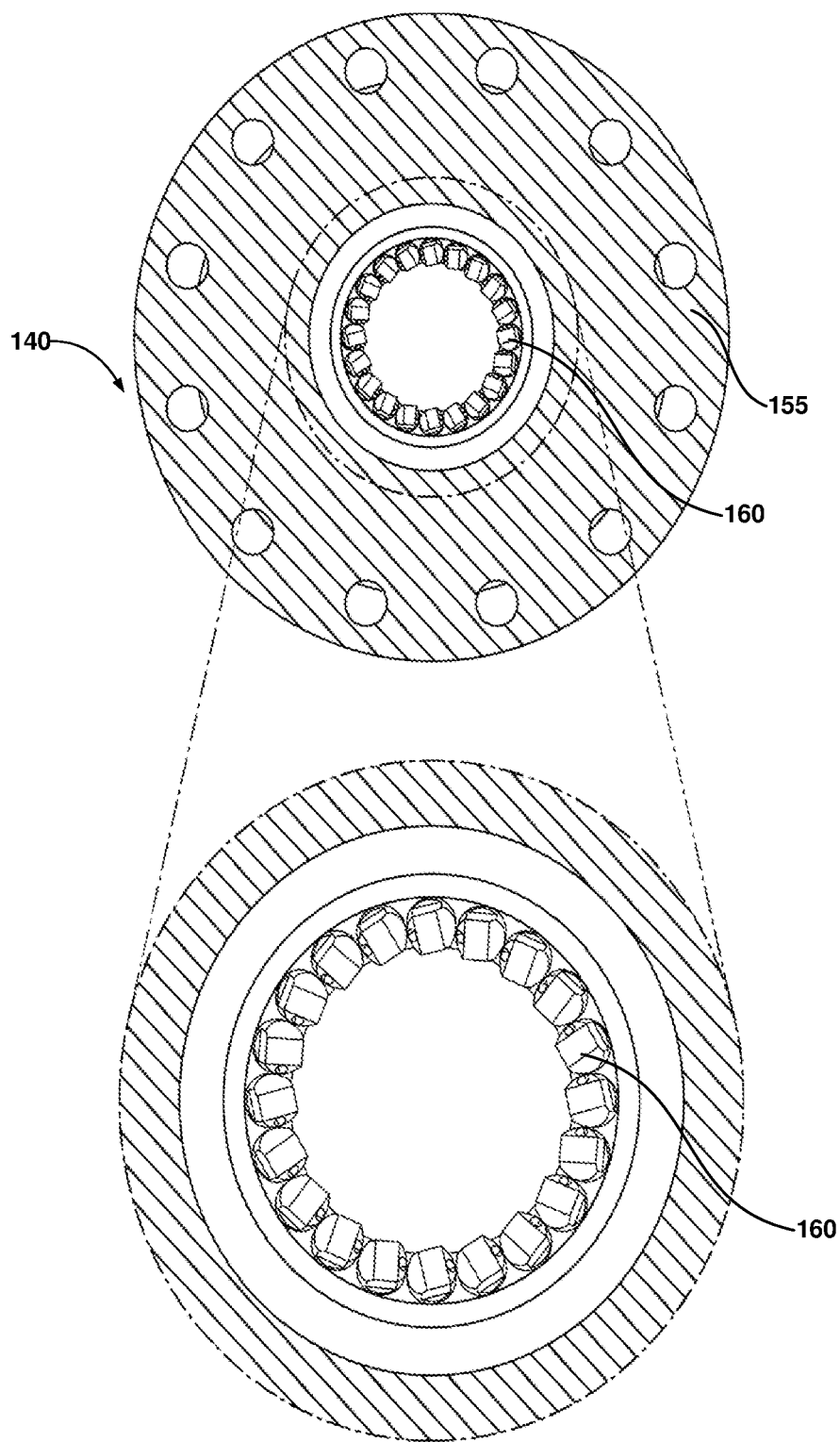
FIG. 10 illustrates a sectional side view of a centrifugal venturi sparger assembly of FIG. 6, wherein a plurality of jet nozzles are shown.

FIG. 10 illustrates a sectional side view of a centrifugal venturi sparger assembly 140 of FIG. 6 taken along sectional lines B-B, wherein a plurality of jet nozzles 160 are shown. Further, FIG. 10 illustrates an enlarged view of a section of a centrifugal venturi sparger assembly 140 shown in a dotted circle. As seen in FIG. 10, the plurality of jet nozzles 160 are arranged in a circular array pattern to assist in producing a centrifugal swirl flow for the fuel gas mixture. In an embodiment as seen in FIG. 10, the plurality of jet nozzles 160 are tangentially angled in nature that assists in swirling (spinning) the fuel gas mixture due to centrifugal force of the fuel gas mixture. The tangentially angled plurality of jet nozzles 160 ejects the fuel gas mixture inside the hollow sparger tube 170 (FIG. 6) in a generally perpendicular direction of the longitudinal axis L (represented in dotted lines in FIG. 6) of the hollow sparger tube 170.

An exemplary method for lowering nitrogen oxides content from a tail gas will now be described in reference to FIGS. 1-10. The method involves the following steps:

Firstly, a tail gas is fed into a tail gas treatment system 100 (FIG. 1); wherein the tail gas treatment system 100 comprises a tail gas main pipe 110, a pair of tail gas bypass pipes 120 and a catalytic reactor 20. Afterward, a fuel such as but not limited to: ammonia gas is introduced (injected) through at least one fuel inlet 152 of the vacuum venturi generator 150 of the centrifugal venturi sparger assembly 140 arranged at an end of the tail gas bypass pipe 120. The vacuum venturi generator 150 operates on the "venturi effect" principle such that when fuel coming from fuel inlet 152 flows through a constricted section (or choke) of the vacuum venturi generator 150, pressure reduction takes place, thereby creating a vacuum which draws a portion of tail gas (referred as "dilution gas") in the vacuum venturi generator 150. Thus, fuel gas mixture is produced. Afterward, using the plurality of jet nozzles 160, the fuel gas mixture is ejected inside the hollow sparger tube 170 of the centrifugal venturi sparger assembly 140. The hollow sparger tube 170, the plurality of jet nozzles 160 and the central swirl tube 180 are dimensionally configured thereby subjecting the fuel gas mixture to a centrifugal swirl process. The centrifugal swirl flow fuel gas mixture, thus produced, is then ejected through the plurality of angled outlet holes 172 and introduced into the tail gas main pipe 110. Afterward, the centrifugal swirl flow fuel gas mixture produced by the centrifugal venturi sparger assembly 140 is mixed with the tail gas in the tail gas main pipe 110. Afterward, the mixture containing the centrifugal swirl flow fuel gas mixture and tail gas is fed into a catalytic reactor 20. The catalytic reactor 20 reduces the nitrogen oxides content of tail gas in the catalytic reactor 20, thereby lowering nitrogen oxides content from tail gas.

Further, it should be understood that the tail gas treatment system 100 includes a plurality of flow control valves 101 (not shown in figures) that are arranged in various pipes such as tail gas main pipe 110, tail gas bypass pipe 120 and fuel supply pipe 153 to control flow rate of at least one of: tail gas, a portion of tail gas ("dilution gas"), and fuel. The flow control valves 101 (not shown in figures) could be any valve known in the art and including but not limited to: gate valve, ball valve, check valve, globe valve, butterfly valve and so on.

The tail gas treatment system 100 is primarily intended for use in a conventional nitric acid production plant 10 (not shown in figures), according to various embodiments of the present invention. However, it should be understood that the tail gas treatment system 100 could be used in other application areas that require lowering nitrogen oxides content from a tail (exhaust) gas. The application areas could include but are not limited to vehicle exhaust, industrial boilers, cement kilns, power plants, gas turbines, and so on.

The various components, and parts of the various embodiments of the tail gas treatment system 100 of the present invention is similar and interchangeable. It is obvious to the one skilled in the art that the various components, and parts of the tail gas treatment system 100 of one embodiment of the present invention could be considered for other embodiments with little or no variation.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A system (100) for lowering nitrogen oxides content in a nitric acid production plant (10), comprising:
   a tail gas main pipe (110) carrying a tail gas;
   at least one tail gas bypass pipe (120) comprising a first end (122) in fluid communication with the tail gas main pipe (110), and an opposite second end (124), wherein the at least one tail gas bypass pipe (120) carries a portion of tail gas;
   a centrifugal venturi sparger assembly (140) arranged at the second end (124) of the tail gas bypass pipe (120) and extending at least substantially in the tail gas main pipe (110), wherein the centrifugal venturi sparger assembly (140) comprises:
   a vacuum venturi generator (150) comprising at least one fuel inlet (152), a gas inlet (153), and at least one jet nozzle (160) in fluid communication with the at least fuel inlet (152) and the gas inlet (153) for ejecting a fuel gas mixture inside a hollow sparger tube (170);
   wherein the hollow sparger tube (170) is configured for producing a centrifugal swirl flow for the fuel gas mixture, and wherein the hollow sparger tube (170) comprises a plurality of angled outlet holes (172) configured to eject the fuel gas mixture in the tail gas main pipe (110);
   a central swirl tube (180) centrally positioned inside the hollow sparger tube (170); and
   a catalytic reactor (20) arranged at an end (111) of the tail gas main pipe (110), wherein the catalytic reactor (20) is configured to reduce nitrogen oxides content of tail gas by catalytic reduction.

2. The system (100) according to claim 1, wherein the fuel comprises at least one of ammonia, hydrogen, or methane.

3. The system (100) according to claim 1, wherein the plurality of angled outlet holes (172) are oblong-shaped in nature.

4. The system (100) according to claim 1, wherein the longitudinal axis of each of the plurality of angled outlet holes (172) subtends an angle in the range of 5 degrees to 85 degrees relative to the longitudinal axis of the hollow sparger tube (170).

5. The system (100) according to claim 1, wherein the hollow sparger tube (170) comprises a first end (170A) and a second end (107B), wherein the first end (170A) is configured to receive the fuel gas mixture ejected by the jet nozzle(s) (160).

6. The system (100) according to claim 5, wherein an end cap (186) is positioned at a second end (170B) of the hollow sparger tube (170).

7. The system (100) according to claim 1 further comprises a plurality of helical strakes (173) formed on an exterior surface (171) of the hollow sparger tube (170).

8. The system (100) according to claim 1 further comprises an aerodynamic tip (182) formed at a first end (180A) of the central swirl tube (180).

9. The system (100) according to claim 1, wherein the central swirl tube (180) further comprises a plurality of swirl baffles (185) configured to swirl the fuel gas mixture of the hollow sparger tube (170).

10. The system (100) according to claim 1, wherein the catalytic reactor (20) comprises at least one catalyst disposed therein and configured to reduce the content of nitrogen oxides in the tail gas by a reaction with the catalyst and/or fuel for decomposition of nitrogen oxides to nitrogen and oxygen.

11. The system (100) according to claim 1, wherein the catalytic reactor (20) comprises a blocking plate (21) configured to provide an impinging surface for the fuel gas mixture entering the catalytic reactor (20), and a plurality of V-shaped notched channels (22) configured to redirect the fuel gas mixture impinging on the blocking plate (21) towards at least one catalyst of the catalytic reactor (20).

12. The system (100) according to claim 1 further comprising a plurality of flow control valves (101) arranged to control the flow rate of at least one of: a tail gas, and fuel.

13. A method for lowering nitrogen oxides content from a tail gas, the method comprising the steps of:
   a) providing a tail gas main pipe (110) and at least one tail gas bypass pipe (120), wherein the tail gas bypass pipe (120) comprises a first end (122) in fluid communication with the tail gas main pipe (110), and an opposite second end (124), wherein a centrifugal venturi sparger assembly (140) is arranged at the second end (124) of the tail gas bypass pipe (120) and extends at least substantially in the tail gas main pipe (110);
   b) feeding tail gas in the tail gas main pipe (110);
   c) introducing a fuel in the centrifugal venturi sparger assembly (140);
   d) drawing a portion of the tail gas in the centrifugal venturi sparger assembly (140), thereby producing a fuel gas mixture;
   e) subjecting the fuel gas mixture to a centrifugal swirl process in the centrifugal venturi sparger assembly (140) for producing a centrifugal swirl flow fuel gas mixture;
   f) mixing the centrifugal swirl flow fuel gas mixture produced by the centrifugal venturi sparger assembly (140) with the tail gas in the tail gas main pipe (110);
   g) feeding the mixture containing the centrifugal swirl flow fuel gas mixture and tail gas in a catalytic reactor (20); and
   h) reducing nitrogen oxides content of tail gas in the catalytic reactor (20), thereby lowering nitrogen oxides content from the tail gas.

* * * * *